(12) United States Patent
Hamada et al.

(10) Patent No.: US 8,401,322 B2
(45) Date of Patent: Mar. 19, 2013

(54) IMAGE RECORDING DEVICE, IMAGE RECORDING METHOD AND PROGRAM

(75) Inventors: Toshimichi Hamada, Tokyo (JP); Masashi Ota, Tokyo (JP); Kiyoshi Ikeda, Kanagawa (JP); Hiromasa Naganuma, Chiba (JP); Yoichi Hirota, Kanagawa (JP)

(73) Assignee: Sony Corporation, Tokyo (JP)

( * ) Notice: Subject to any disclaimer, the term of this patent is extended or adjusted under 35 U.S.C. 154(b) by 372 days.

(21) Appl. No.: 12/816,831

(22) Filed: Jun. 16, 2010

(65) Prior Publication Data

US 2011/0019931 A1 Jan. 27, 2011

(30) Foreign Application Priority Data

Jul. 27, 2009 (JP) ................................. 2009-174395

(51) Int. Cl.
*G06K 9/36* (2006.01)
(52) U.S. Cl. ...................................................... 382/251
(58) Field of Classification Search .......... 382/232–233, 382/252; 358/1.9, 3.13, 3.16, 3.23, 426.03, 358/426.07, 426.09, 426.11, 524; 345/204, 345/419, 422, 531, 550, 581, 596, 600, 605, 345/619, 698; 702/81
See application file for complete search history.

(56) References Cited

U.S. PATENT DOCUMENTS

| 7,151,619 B2* | 12/2006 | Toyoda et al. ............... 358/3.13 |
| 2010/0104218 A1* | 4/2010 | Tsukamoto et al. .......... 382/284 |

FOREIGN PATENT DOCUMENTS

| JP | 9-219833 | 8/1997 |
| JP | 9-219883 | 8/1997 |
| JP | 2008-306656 | 12/2008 |
| JP | 2009-81848 | 4/2009 |

* cited by examiner

*Primary Examiner* — Jose Couso
(74) *Attorney, Agent, or Firm* — Oblon, Spivak, McClelland, Maier & Neustadt, L.L.P.

(57) ABSTRACT

There is provided an image recording device, including: a highly-gradating unit for highly-gradating an input image having a first gradation depth, thereby generating a high gradation image having a second gradation depth higher than the first gradation depth; an image quantizing unit for quantizing the high gradation image generated by the highly-gradating unit such that a quantization error is modulated into a band with relatively low sensitivity of human visual characteristics, thereby generating a recording target image having a third gradation depth lower than the second gradation depth; an encoding unit for encoding the recording target image generated by the quantizing unit; and a recording unit for recording the recording target image encoded by the encoding unit in a recording medium.

17 Claims, 8 Drawing Sheets

IMAGE RECORDING DEVICE, IMAGE RECORDING METHOD AND PROGRAM

BACKGROUND OF THE INVENTION

1. Field of the Invention

The present invention relates to an image recording device, an image recording method and a program.

2. Description of the Related Art

In general, when recording digital image data in a recording medium, a gradation depth (also referred to as a bit depth) of the image data to be recorded is determined according to an encoding method complying with the recording medium. For example, when using a Blu-ray Disc™ (BD) and a DVD as the recording medium, an 8-bit gradation depth is used for each color of YUV and the like. However, a gradation depth of the image data to be recorded is not necessarily 8 bits, and in a field of contents creation including authoring, for example, when image quality is especially important, image data having 10-bit or higher gradation depth for each YUV may be handled. In this case, image data with a high gradation depth is quantized such that the gradation depth changes into 8 bits, for example, when being recorded in the above-described recording medium.

By performing such a quantization process, data amount may be reduced by bit cut off, while image quality might be deteriorated, that is to say, smooth gradation characteristics are lost and false contour (color banding) may occur, for example. In this regard, a method such as a systematic dithering method for modulating an error generated by the quantization process into a band with relatively low sensitivity of human visual characteristics or an error diffusion method is known. By using the method such as the systematic dithering method or the error diffusion method, the image quality deterioration perceived by the user may be inhibited to a certain degree. Further, according to the method disclosed in the Japanese Patent Application Laid-Open No. 2009-81848, it is possible to inhibit the image quality deterioration perceived by the user by performing noise shaping having amplitude characteristics similar to inverse characteristics of human vision and while inhibiting a hunting phenomenon.

Also, as techniques to inhibit an image quality deterioration perceived by a user by another approach, technique to expand the gradation depth so as to obtain better image quality when reproducing an image data recorded in a recording medium is suggested (for example, refer to the Japanese Patent Application Laid-Open Nos. H09-219833 and 2008-306656).

SUMMARY OF THE INVENTION

However, for the image data already quantized and the gradation depth thereof is reduced, the method to perform the quantization while maintaining the image quality such as the systematic dithering method, the error diffusion method, or the method disclosed in the Japanese Patent Application Laid-Open No. 2009-81848 may not be applied. Although the methods disclosed in the Japanese Patent Application Laid-Open Nos. H09-219833 and 2008-306656 to expand the gradation depth when reproducing the image data are effective for the image reproduced and displayed, for example, they do not improve the quality of the image recorded in the recording medium.

Therefore, the present invention is to provide novel and improved image recording device, image recording method and program, capable of converting an image data of which gradation depth is reduced by the quantization into an image data having an image quality visually closer to an image quality with higher gradation depth and record the same.

According to an embodiment of the present invention, there is provided a n image recording device, including: a highly-gradating unit for highly-gradating an input image having a first gradation depth, thereby generating a high gradation image having a second gradation depth higher than the first gradation depth; an image quantizing unit for quantizing the high gradation image generated by the highly-gradating unit such that a quantization error is modulated into a band with relatively low sensitivity of human visual characteristics, thereby generating a recording target image having a third gradation depth lower than the second gradation depth; an encoding unit for encoding the recording target image generated by the quantizing unit; and a recording unit for recording the recording target image encoded by the encoding unit in a recording medium.

According to such a configuration, when the gradation depth (first gradation depth) of the input image is the gradation depth with which sufficient gradation reproducibility may not be expected, the gradation depth of the input image is temporarily increased to the second gradation depth by a highly gradating process by the highly-gradating unit. Then, the high gradation image of which gradation depth is increased is quantized to the third gradation depth lower than the second gradation depth by the image quantizing unit. At that time, the quantization process by the image quantizing unit is performed such that the quantization error is modulated into the band with relatively low sensitivity of the human visual characteristics. According to this, the recording target image of which image quality perceived by a user is increased than that of the input image is generated, and the recording target image is encoded and is thereafter recorded in a recording medium.

The image recording device may further include a controlling unit for switching off the image quantizing unit and allow the encoding unit to encode the input image as the recording target image when a value lower than a specific threshold is set as a bit rate of an encoding process of the encoding unit.

The image recording device may further include an analyzing unit for outputting image quality deterioration data indicating presence or absence of image quality deterioration for each partial image having one or more pixels included in the input image, and the image quantizing unit may generate the recording target image by using a pixel value obtained by quantizing the high gradation image such that the quantization error is modulated into the band with relatively low sensitivity of the human visual characteristics for a partial image in which the image quality deterioration occurs and using a pixel value of the input image for a partial image in which the image quality deterioration does not occur based on the image quality deterioration data.

The image quality deterioration data may be data indicating whether a false contour occurs or not for each partial image.

The image recording device may further include a controlling unit for temporarily increasing an amount of bits assigned to an encoding process by the encoding unit for an entire of the recording target image of which quantization process by the image quantizing unit is performed or a part of which the quantization process is performed.

According to another embodiment of the present invention, there is provided an image recording method, including the steps of: highly-gradating an input image having a first gradation depth, thereby generating a high gradation image having a second gradation depth higher than the first gradation depth; quantizing the high gradation image such that a quantization error is modulated into a band with relatively low sensitivity of human visual characteristics, thereby generating a recording target image having a third gradation depth lower than the second gradation depth; encoding the recording target image; and recording the encoded recording target image in a recording medium.

According to another embodiment of the present invention, there is provided a program for causing a computer for controlling an image recording device function as: a highly-gradating unit for highly-gradating an input image having a first gradation depth, thereby generating a high gradation image having a second gradation depth higher than the first gradation depth; an image quantizing unit for quantizing the high gradation image generated by the highly-gradating unit such that a quantization error is modulated into a band with relatively low sensitivity of human visual characteristics, thereby generating a recording target image having a third gradation depth lower than the second gradation depth; an encoding unit for encoding the recording target image generated by the quantizing unit; and a recording unit for recording the recording target image encoded by the encoding unit in a recording medium.

As described above, according to the image recording device, the image recording method and the program according to embodiments of the present invention, the image data of which gradation depth is reduced by quantization may be converted to an image data having an image quality visually closer to an image quality with higher gradation depth and recorded.

DETAILED DESCRIPTION OF THE EMBODIMENT(S)

Hereinafter, preferred embodiments of the present invention will be described in detail with reference to the appended drawings. Note that, in the specification and the appended drawings, structural elements that have substantially the same function and structure are denoted with the same reference numerals, and repeated explanation of these structural elements is omitted.

The "detailed description of the embodiment(s)" is described in a following order.
1. Example of image recording device according to an embodiment
2. Configuration example for image quality conversion process according to an embodiment
3. Example of control of image quality conversion process according to an embodiment
4. Summary <1. Example of Image Recording Device According to an Embodiment>

Figure 1:
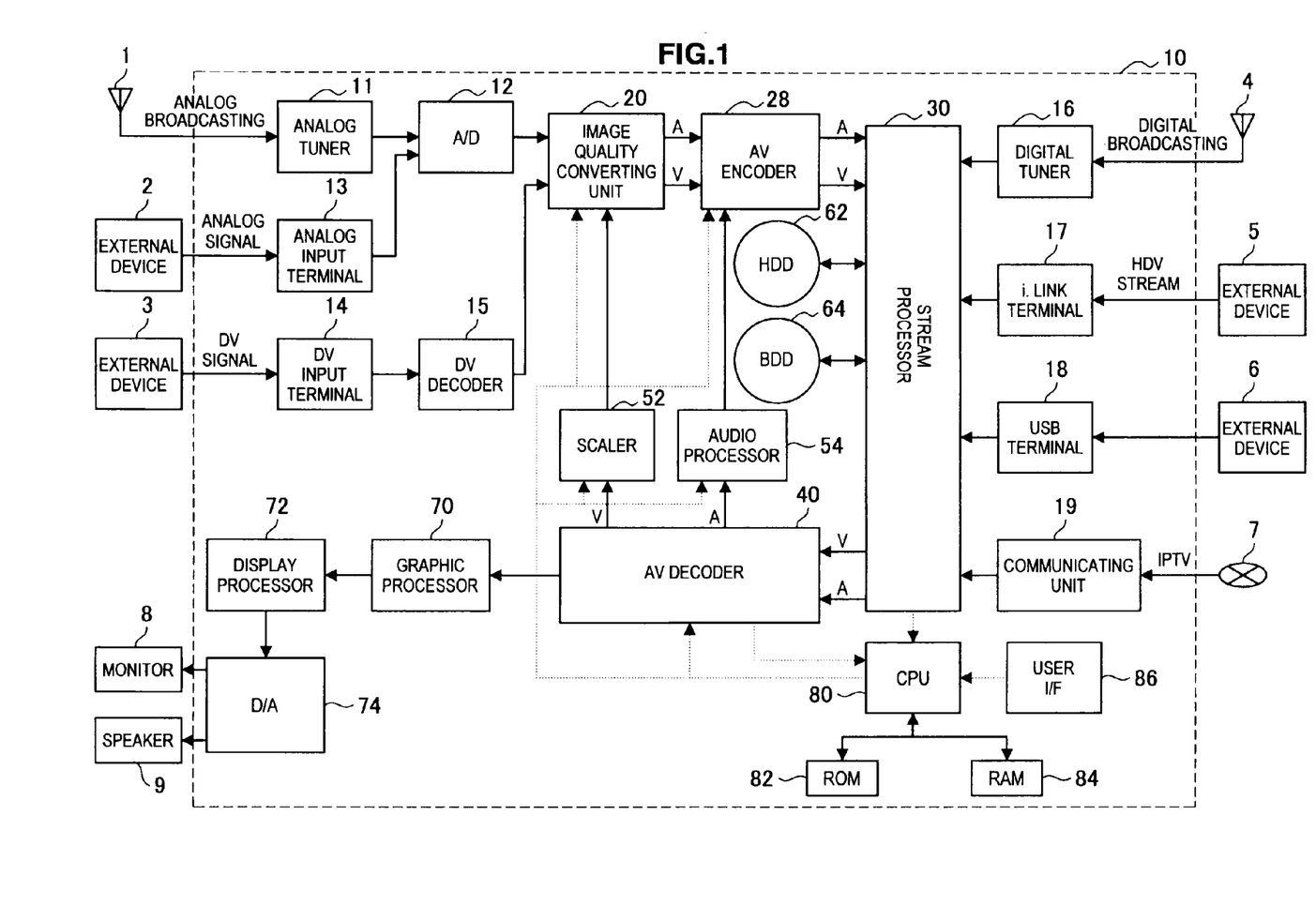
FIG. 1 is a block diagram illustrating a configuration of an image recording device to which an embodiment of the present invention is applicable.

First, an example of an image recording device to which an image conversion process according to an embodiment of the present invention is applicable is described. With reference to FIG. 1, an image recording device 10 as an example is illustrated. The image recording device 10 is configured, for example, as the image recording device capable of recording video data including image data or a series of image data and audio data received via a network or input from an external device to a recording medium. That is to say, the image recording device 10 serves to record the image data and the audio data input from outside to the recording medium such as a hard disk or a BD. Also, as is understood from FIG. 1, the image recording device 10 as an example also serves to reproduce the image data and the audio data recorded in the above-described recording medium.

With reference to FIG. 1, the image recording device 10 is provided with an analog tuner 11, an A/D converter 12, an analog input terminal 13, a DV input terminal 14, a DV decoder 15, a digital tuner 16, an i.LINK terminal 17, a USB terminal 18, a communicating unit 19, an image quality converting unit 20, an AV encoder 28, a stream processor 30, an AV decoder 40, a scaler 52, an audio processor 54, a hard disk drive (HDD) 62, a BDD 64, a graphic processor 70, a display processor 72, a D/A converter 74, a central processing unit (CPU) 80, a read only memory (ROM) 82, a random access memory (RAM) 84 and a user interface 86.

The analog tuner 11 selects a target channel from airwaves received by an antenna 1 for analog broadcasting and performs demodulation of a radio wave of the channel to generate a received signal (analog signal of video and audio). Further, the analog tuner 11 performs specific video signal processing such as amplification of an intermediate frequency, separation of a color signal, generation of a color-difference signal and extraction of a synchronization signal to the received signal, and outputs the video signal including a series of image data. The A/D converter 12 converts the analog signal of video and audio input from the above-described analog tuner 11, the analog input terminal 13 and the like to a digital signal at a specific sampling frequency to output to the image quality converting unit 20. Meanwhile, the analog signal of video and audio is input from an external device 2 to the analog input terminal 13. Also, a DV signal of video and audio is input from an external device 3 such as a DV digital video camera to the DV input terminal 14. The DV decoder 15 decodes the DV signal to output to the image quality converting unit 20.

The digital tuner 16 selects a target channel from the radio wave received by an antenna 4 for satellite broadcasting or terrestrial digital broadcasting and outputs digital data (bit stream) of video including a series of image data and audio of the channel to the stream processor 30. Also, external devices 5 and 6 such as a high definition video (HDV) digital video camera are connected to an external input terminal such as the i.LINK terminal 17 and the USB terminal 18. A HDV signal (stream) of video and audio transferred from the external device 5 via IEEE1394 is input to the stream processor 30 through the I.LINK terminal 17. The communicating unit 19 transmits and receives a variety of data to and from an external device (not illustrated) via an IP network such as Ethernet™ 7. For example, the communicating unit 19 receives the video and audio signals of a program of internet protocol television (ITPV) distributed via the Ethernet 7 and the like and outputs to the stream processor 30.

The image quality converting unit 20 converts image quality of each input image included in the video signal input from the A/D converter 12, the DV decoder 15, the scaler 52 or the like to generate a recording target image, as a preliminary step of an encoding process of the image by the AV encoder 28. Then, the image quality converting unit 20 outputs generated recording target image to the AV encoder 28. On the other hand, the image quality converting unit 20 outputs the audio data input from the A/D converter 12 or the DV decoder 15, for example, to the AV encoder 28 without employing a special process thereto. A specific configuration for an image quality conversion process by the image quality converting unit 20 is described later in more detail.

The AV encoder 28 corresponds to hardware of an encoding unit. The AV encoder 28 compresses/encodes the digital data of a series of recording target images input from the image quality converting unit 20 and the digital data of audio input from the audio processor 54 and the like to a specific recording format. The AV encoder 28 may be a high-performance encoder capable of supporting HD video and SD video, for example. Also, the AV encoder 28 may be the encoder capable of supporting stereo audio and multi-channel audio. The AV encoder 28 outputs the digital data (bit stream) of the encoded recording target image and audio to the stream processor 30.

The stream processor 30 performs specific data processing to the recording target data or reproducing target data (stream) at the time of recording or reproducing of the data. For example, at the time of data recording, the stream processor 30 multiplexes and encrypts compressed data encoded by the above-described AV encoder 28 and records the data in the recording medium of the HDD 62 or the BDD 64 while performing buffer control. Also, at the time of data reproducing, the stream processor 30 decrypts and demultiplexes the compressed data read from the recording medium of the HDD 62 or the BDD 64 and outputs to the AV decoder 40.

The AV decoder 40 performs a decoding process to expand the compressed video and audio input from the stream processor 30.

As a compression-encoding method (codec type) used in the above-described AV encoder 28 and the AV decoder 40, for the video including a series of image data, MPEG2, H.264 (AVC: advanced video coding), VC1 and the like may be used, for example. Also, for the audio, Dolby AC3, MPEG2 AAC (advanced audio coding), LPCM (linear pulse code modulation) and the like may be used. Also, as a size of the image data included in the video signal, "480i", "480p", "720p", "1080i", "1080p" and the like may be used. Also, as a number of channels of the audio signal, "2CH", "5.1CH", "7.1CH" and the like may be used. Note that, in general, the AV decoder is often designed to be able to support the video/audio formats according to a variety of broadcastings and type of the recording media (BD and the like). On the other hand, the AV encoder may be designed to be able to support only some optional video/audio format.

The scaler 52 converts the format of the video signal input from the AV decoder 40 to a specific recording format based on an instruction from the CPU 80. For example, when the video signal in the format of "720p", "1080p" and the like belonging to a HD category is input, the scaler 52 may convert the video signal to the specific recording format (such as "1080i") of the HD category, which the image recording device 10 may support. Then, the scaler 52 outputs the converted video signal to the AV encoder 28.

The audio processor 54 converts the format of the audio signal input from the AV decoder 40 to the specific recording format based on the instruction from the CPU 80. For example, the audio processor 54 may convert the audio signal in the format of "7.1CH", "4CH", "5CH" and the like belonging to a multichannel category to the specific recording format (such as "5.1CH"), which the image recording device 10 may support. Then, the audio processor 54 outputs the converted audio signal to the AV encoder 28.

The hard disk drive (HDD) 62 records the stream of the video/audio signals input from the stream processor 30 to the hard disk, which is the recording medium, for example. Also, the HDD 62 reads the data recorded in the hard disk to output to the stream processor 30, for example. Similarly, the BD drive (BDD) 64 also writes the stream to the BD, which is the recording medium, or reads the stream from the BD, for example. Note that, the recording medium in which the video/audio signals are recorded is not limited to such an example, and may be, for example, an optical disk such as a DVD-R, a DVD-RW, a DVD-RAM and a magneto optical disk or a variety of semiconductor memories such as a flash memory. Also, the recording medium may be embedded in the image recording device 10 and may be detachably attached.

The graphic processor 70 generates display data or a caption indicating operation setting or operating condition of the image recording device 10 and overlays the same on the image input from the AV decoder 40. The display processor 72 shapes an overlaid image input from the graphic processor 70 according to an output format to output to the D/A converter 74, for example. The D/A converter 74 converts the digital signal of video including a series of images and audio input from the display processor 72 to the analog signal to output to a monitor 8 and a speaker 9.

The CPU 80 serves as an arithmetic processing unit and a controlling device to control each unit of the image recording device 10. The CPU 80 executes a variety of processes by using the RAM 84 according to a program stored in the ROM 82, or a program loaded from the HDD 62 or the BDD 64 to the RAM 84. The ROM 82 stores the program used by the CPU 80 and an appropriately changing parameter and the like.

The user interface 86 serves as an input unit for a user to input a variety of instructions to the image recording device 10. The user interface 86 may be formed of operating means such as a button, a switch, a touch panel and a remote controller and an input control circuit for generating an input signal according to an input operation to the operating means to output to the CPU 80 and the like.

Note that, the image recording device 10 capable of recording the video including a series of image data and the audio in the recording medium and of reproducing the video and the audio recorded in the recording medium is herein described as an example of the image recording device to which the image quality conversion process according to an embodiment of the present invention may be applied. However, as is clear from the following description, the image quality conversion process according to an embodiment of the present invention may be applied to all the image recording devices capable of recording at least one or more image data. That is to say, among the units of the image recording device 10 illustrated in FIG. 1, for example, the unit corresponding to the recording and reproducing of the audio or the unit corresponding to the reproducing of the video (image) may be omitted.

<2. Configuration Example for Image Quality Conversion Process According to an Embodiment>

As described above, according to the image recording device 10 illustrated in FIG. 1, the image data received via the network, or the image data input from the external device and the like may be recorded in the recording medium such as the BD or the hard disk, for example. At that time, many image data generally distributed has a gradation depth of 8 bits. However, when the image data quantized to the gradation depth of 8 bits is displayed on a display or printed, there is a case in which a curve like a level curve pattern referred to as a false contour occurs in a portion in which brightness should gradually changes. This is because, the gradation depth of 8 bits is not sufficient in the portion in which the brightness gradually changes, and as a result of quantization roughness, the change in brightness appears stepwise. Therefore, the image quality converting unit 20 illustrated in FIG. 1 converts the input image including image quality deterioration such as the false contour into an image in which gradation reproducibility is enhanced (that is to say, the image quality perceived by the user is improved).

Figure 2:
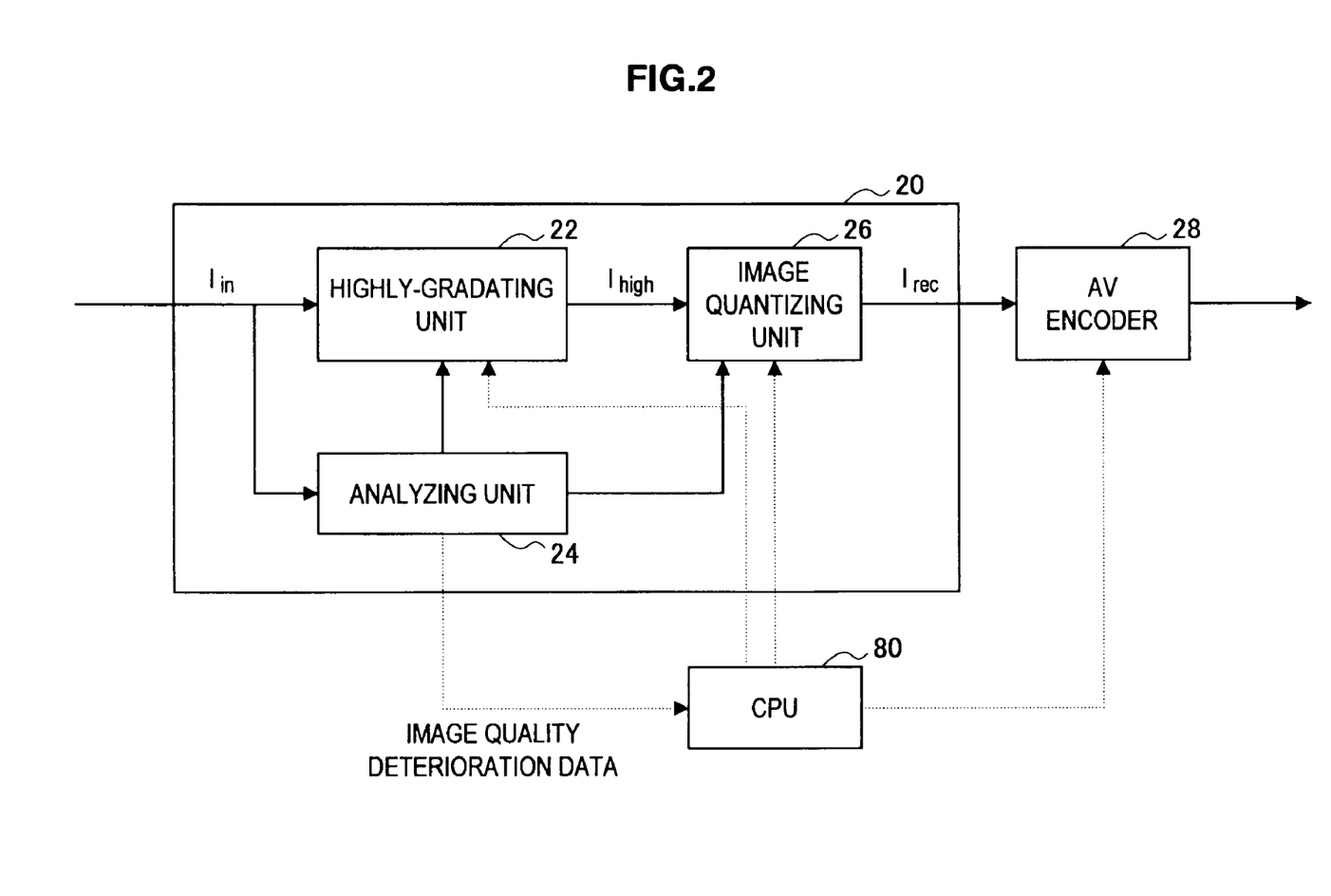
FIG. 2 is a block diagram illustrating a configuration for an image quality conversion process according to an embodiment of the present invention.

FIG. 2 is a block diagram illustrating a configuration of the image quality converting unit 20 for the image quality conversion process and a related processing block according to this embodiment. With reference to FIG. 2, the image quality converting unit 20 of the image recording device 10 includes a highly-gradating unit 22, an analyzing unit 24 and an image quantizing unit 26. FIG. 2 also illustrates the AV encoder 28 connected to the image quantizing unit 26 and the CPU 80, which controls each unit of the image quality converting unit 20 and the AV encoder 28.

In FIG. 2, each input image $I_{in}$ included in the video signal input from the A/D converter 12, the DV decoder 15 or the scaler 52 is sequentially supplied to the highly-gradating unit 22 and the analyzing unit 24. The input image $I_{in}$ is, for example, an image having a first gradation depth corresponding to 8 bits and the like for each YUV. The highly-gradating unit 22 highly-gradates such input image $I_{in}$, thereby generating a high gradation image $I_{high}$ having a second gradation depth higher than the first gradation depth.

The highly gradating process by the highly-gradating unit 22 may use a classification adaptive process disclosed in the above-described Japanese Patent Application Laid-Open No. H09-219833, for example. In this case, the highly-gradating unit 22 classifies the pixels of the input image $I_{in}$ into specific classes and calculates each pixel value of the high gradation image $I_{high}$ by using a predictive coefficient corresponding to the classified class and pixel values around a pixel of interest. Also, the highly gradating process by the highly-gradating unit 22 may use a method disclosed in the above-described Japanese Patent Application Laid-Open No. 2008-306656, for example. In this case, the highly-gradating unit 22 first expands the gradation depth of the input image $I_{in}$ to allow the image signal in a high-frequency band to pass by using a bandpass filter. Next, the highly-gradating unit 22 limits amplitude of the image signal in the high-frequency band, which is allowed to pass, to a specific level by using a limiter. Then, the highly-gradating unit 22 subtracts the image signal of which amplitude is limited from the image signal of the input image $I_{in}$, thereby generating the high gradation image $I_{high}$ having the second gradation depth. By such highly gradating process, for example, the image quality deterioration such as the false contour occurring due to the quantization roughness at the time of generation of the input image $I_{in}$ is improved in the high gradation image $I_{high}$ having the second gradation depth. Note that, the second gradation depth may be an optional value larger than 8 bits (such as 10, 12 or 14 bits) for example, when the first gradation depth is 8 bits.

In addition to the above-described highly gradating process, the highly-gradating unit 22 may apply a smoothing filter to a pixel (or a partial image including a plurality of pixels) in which the false contour highly possibly occurs, thereby further improving the image quality. Also, the highly-gradating unit 22 may generate the high gradation image $I_{high}$ of which block noise or mosquito noise is removed by executing field recursive noise reduction or compression-type noise reduction. Further, the highly-gradating unit 22 may perform a variety of image quality adjusting process such as tone curve, color adjusting and enhancing.

In this manner, the high gradation image $I_{high}$ generated by the highly-gradating unit 22 is supplied to the image quantizing unit 26.

Meanwhile, the analyzing unit 24 generates image quality deterioration data indicating presence or absence of the image quality deterioration for each partial image of a size of at least one pixel included in the input image $I_{in}$. The image quality deterioration data generated by the analyzing unit 24 may be used by the CPU 80, which operates as the controlling unit, or the image quantizing unit 26, for example, as described later. Also, the analyzing unit 24 may adjust a gain in the highly gradating process by the highly-gradating unit 22 according to a degree of image quality deterioration determined according to the method disclosed in the above-described Japanese Patent Application Laid-Open No. 2008-306656, for example.

More specifically, the analyzing unit 24 sequentially sets each one of the pixels included in the input image $I_{in}$ as the pixel of interest. Then, the analyzing unit 24 determines relationship between the pixel of interest and neighboring pixels in a horizontal direction, thereby determining whether the pixel of interest is visible as a portion in which the false contour occurs. Determination of whether the portion is visible as the false contour may be performed based on three determination criteria at steps S102, S104 and S106 illustrated in FIG. 3, for example.

Figure 3:
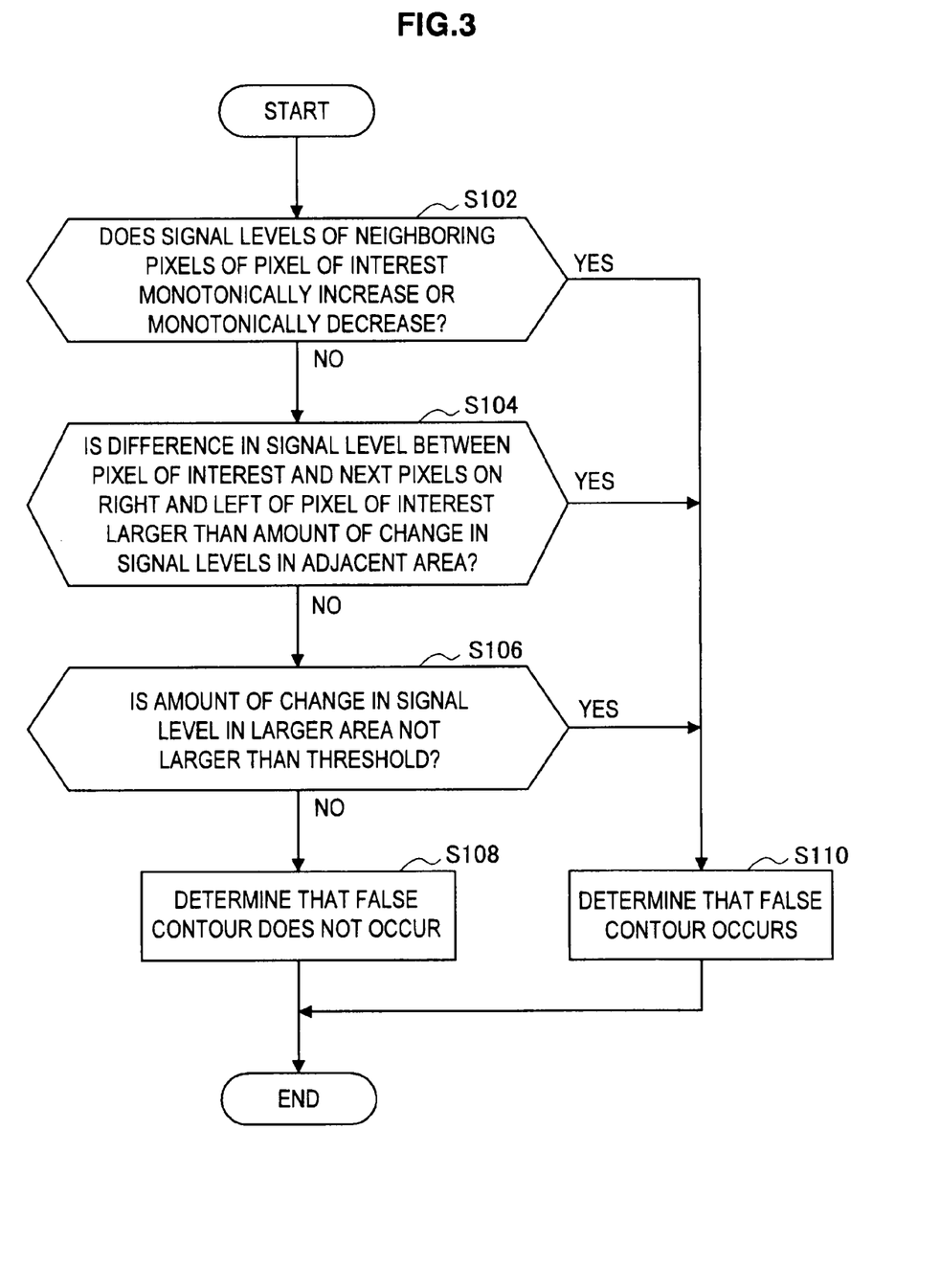
FIG. 3 illustrates an example of a flowchart for determining presence or absence of image quality deterioration.

FIG. 3 illustrates an example of a flowchart for determining the presence or absence of the image quality deterioration by the analyzing unit 24. With reference to FIG. 3, the analyzing unit 24 first determines whether signal levels in neighboring pixels of the pixel of interest monotonically increases or monotonically decreases in the horizontal direction at the step S102. Herein, when signal levels in the neighboring pixels monotonically increases or monotonically decreases, the process proceeds to a step S110. If this is not the case, the process proceeds to the step S104.

Next, at the step S104, the analyzing unit 24 determines whether difference in signal level between the pixel of interest and next pixels on right and left of the pixel of interest is larger than an amount of change in signal level in a certain area including adjacent pixels (hereinafter, referred to as an adjacent area). Herein, when the difference in signal level between the pixel of interest and the next pixels on right and left of the pixel of interest is larger than the amount of change in signal level in the adjacent area, the process proceeds to the step S110. If this is not the case, the process proceeds to the step S106.

Next, at the step S106, the analyzing unit 24 determines whether the amount of change in signal level in an area formed of neighboring pixels of a larger area is not larger than a preset threshold value. Herein, when the amount of change in signal level in the area formed of neighboring pixels of the larger area is not larger than the above threshold, the process proceeds to the step S110. If this is not the case, the process proceeds to a step S108.

As a result of such conditional determination, the analyzing unit 24 determines that the pixel of interest at the time is not the pixel in which a false contour occurs at the step S108. On the other hand, the analyzing unit 24 determines that the pixel of interest at that time is the pixel in which a false contour occurs (possibly occurs) at the step S110.

The analyzing unit 24 repeats such conditional determination for all the pixels included in the input image $I_{in}$, and generates the image quality deterioration data indicating whether the image quality deterioration occurs for each pixel by either value of "0" and "1", for example. Alternatively, the analyzing unit 24 may generate the above-described image quality deterioration data not for each pixel but for each partial image including a plurality of pixels.

The image quantizing unit 26 quantizes the above-described high gradation image $I_{high}$ having the second gradation depth input from the highly-gradating unit 22, thereby generating a recording target image $I_{rec}$ having a third gradation depth lower than the above-described second gradation depth. At that time, the image quantizing unit 26 quantizes the high gradation image $I_{high}$ such that a quantization error is modulated into a band with relatively low sensitivity of human visual characteristics. Therefore, the image quality perceived by the user when the recording target image $I_{rec}$ is reproduced becomes higher than that when the input image $I_{in}$ is reproduced.

Figure 4:
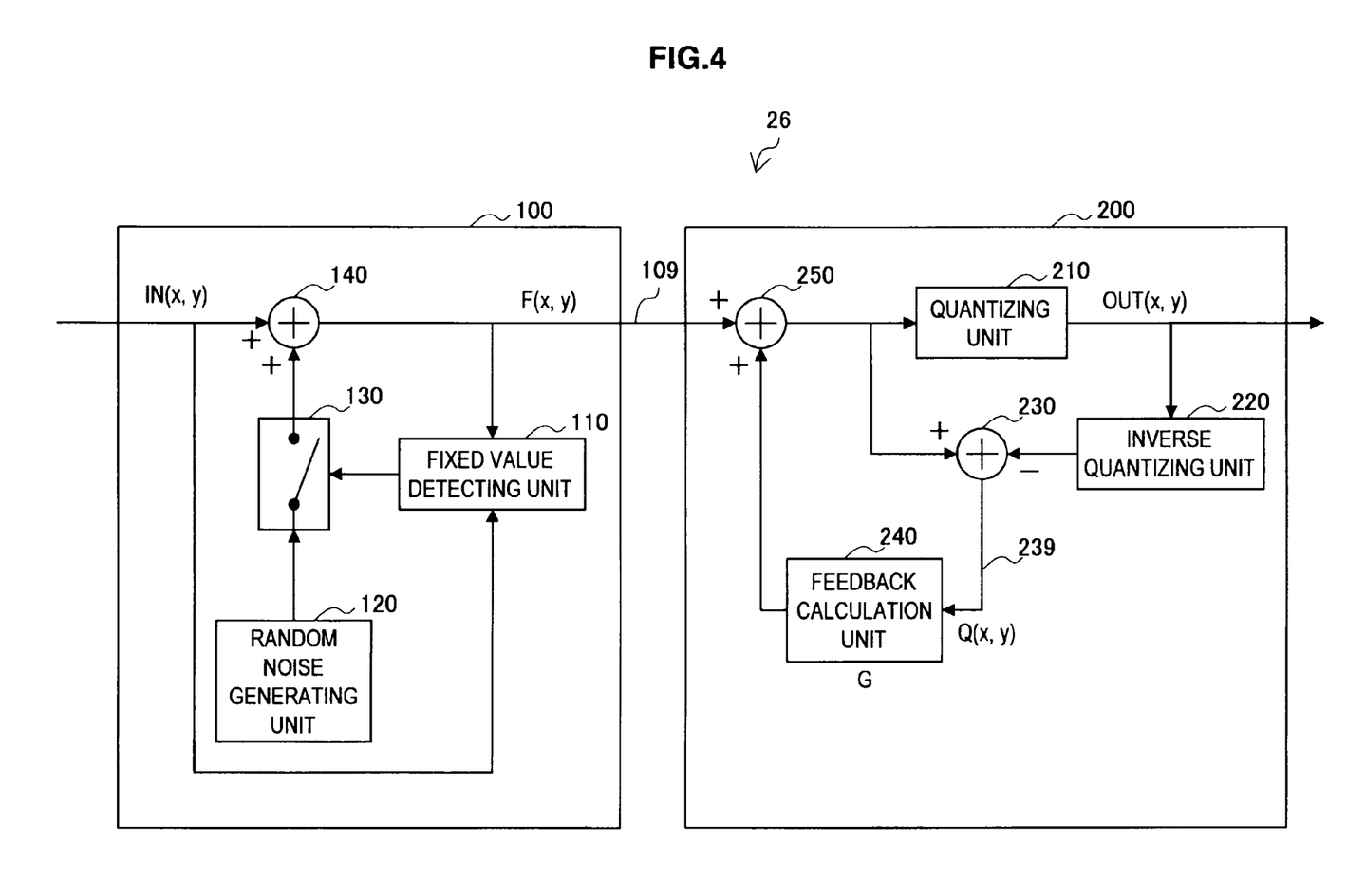
FIG. 4 is a block diagram illustrating an example of a specific configuration of an image quantizing unit according to an embodiment of the present invention.

FIG. 4 is a block diagram illustrating an example of a further specific configuration of the image quantizing unit 26. With reference to FIG. 4, the image quantizing unit 26 includes a stabilizer 100 and a gradation modulator 200. Also, in FIG. 4, a two-dimensional image signal of the high gradation image $I_{high}$ input from the highly-gradating unit 22 is represented as an input signal IN(x,y), and a two-dimensional image signal of the recording target image $I_{rec}$ output as a result of the process by the image quantizing unit 26 is represented as an output signal OUT(x,y).

The stabilizer 100 includes a fixed value detecting unit 110, a random noise generating unit 120, a switch 130 and an adder 140. The gradation modulator 200 includes a quantizing unit 210, an inverse quantizing unit 220, a subtracter 230, a feedback calculation unit 240 and an adder 250. The stabilizer 100 and the gradation modulator 200 are connected to each other by means of a signal line 109.

The fixed value detecting unit 110 compares whether the input signal In(x,y) has the same data as a past modified signal F(x,y), thereby detecting that the same data is continuously input as a fixed value.

The random noise generating unit 120 generates a random noise. The random noise generating unit 120 may generate a random noise having a noise level depending on a filter coefficient of the feedback calculation unit 240 of the gradation modulator 200, for example.

The switch 130 is a switch controlled on/off by the fixed value detecting unit 110. When the fixed value (that is to say, the continuous input of the same data) is detected by the fixed value detecting unit 110, the switch 130 supplies the random noise generated by the random noise generating unit 120 to the adder 140. In other case, the switch 130 does not supply the random noise to the adder 140.

The adder 140 adds the input signal In(x,y) to the output signal of the switch 130. That is to say, when the random noise is supplied from the switch 130, the adder 140 outputs the modified signal F(x,y) generated by adding the input signal IN(x,y) to the random noise to the signal line 109. On the other hand, when the random noise is not supplied from the switch 130, the adder 140 directly outputs the input signal IN(x,y) as the modified signal F(x,y) to the signal line 109.

The modified signal F(x,y) output from the stabilizer 100 to the signal line 109 is input to the gradation modulator 200.

The quantizing unit 210 of the gradation modulator 200 quantizes the output of the adder 250 to the third gradation depth lower than the second gradation depth. For example, when the second gradation depth is 14 bits and the third gradation depth is 8 bits, the quantizing unit 210 cuts off low 6 bits out of 14 bits to output high 8 bits as the output signal OUT(x,y).

The inverse quantizing unit 220 inverse-quantizes (dequantize) the output signal OUT(x,y) quantized by the quantizing unit 210. More specifically, for example, when the second gradation depth is 14 bits and the third gradation depth is 8 bits, the inverse quantizing unit 220 embeds "000000" to the low 6 bits of the output signal OUT(x,y) to output 14-bit wide data.

The subtracter 230 calculates a quantization error Q(x,y) cut off by the quantizing unit 210 by subtracting the output of the inverse quantizing unit 220 from the output of the adder 250. Then, the subtracter 230 outputs the calculated quantization error Q(x,y) to a signal line 239.

The feedback calculation unit 240 multiplies the filter coefficient set in advance by the past quantization error Q(x,y) output from the subtracter 230 and adds them. A value calculated by a product-sum operation by the feedback calculation unit 240 is supplied to the adder 250 as a feedback value.

The adder 250 adds the modified signal F(x,y) input to the gradation modulator 200 to the feedback value supplied from the feedback calculation unit 240 and outputs the result to the quantizing unit 210 and the subtracter 230.

That is to say, in the image quantizing unit 26 illustrated in FIG. 4, the gradation modulator 200 forms a $\Delta\Sigma$ modulator and has a noise shaping effect to modulate the quantization error (quantization noise) into a high-frequency region. Herein, in order to modulate the quantization error into the band, which is hardly perceived by human eye even when the highest frequency per unit angle relative to a view angle is approximately 30 cpd, for example, it is desirable to set filter characteristics to a higher region than those of a Jarvis filter and a Floyd filter. However, when the filter characteristics are set to such high region, a hunting phenomenon in which the $\Delta\Sigma$ modulator diverges easily occurs. The hunting phenomenon is a phenomenon occurring when the same data is continuously input. On the other hand, when the same data is continuously input, the stabilizer 100 of the image quantizing unit 26 adds a minute noise, for the $\Delta\Sigma$ modulator does not diverge. According to this, occurrence of the hunting phenomenon in the image quantizing unit 26 is avoided.

With reference to FIG. 2 again, the description of the configuration for the image quality conversion process according to this embodiment is continued.

The AV encoder 28 is operated as the encoding unit in the image recording device 10 as described above. When the recording target image $I_{rec}$ having the third gradation depth is input from the image quantizing unit 26, the AV encoder 28 compresses/encodes the recording target image $I_{rec}$ according to the specific recording format such as MPEG2, and outputs the data to the stream processor 30 illustrated in FIG. 1.

The CPU 80 serves as the arithmetic processing unit and the control device as described above and is operated as the controlling unit in the image quality conversion process according to this embodiment.

<3. Example of Control of Image Quality Conversion Process According to an Embodiment>

In this section, four examples of the control of the image quality conversion process by the CPU 80 illustrated in FIG. 2 are described in detail with reference to FIGS. 5 to 8.

3-1. First Example

At first, for example, the recording target image $I_{rec}$ generated by the above-described image quantizing unit 26 generally has much small amplitude of high frequency as compared to the input image $I_{in}$. Therefore, when compressing/encoding the recording target image $I_{rec}$ according to the general recording format, it is not possible to efficiently obtain high compressibility, and as a result, it might be difficult to achieve a low bit rate. Therefore, for example, when the bit rate of the encoding process by the AV encoder 28 is set to be lower than a specific threshold, the CPU 80 may switch off the process of the highly-gradating unit 22 and the image quantizing unit 26 and directly output the input image as the recording target image $I_{rec}$ to the AV encoder 28. The bit rate of the encoding process in the AV encoder 28 is specified by the user by means of the user interface 86 illustrated in FIG. 1, for example, and is held in advance in any recording medium of the image recording device 10.

Figure 5:
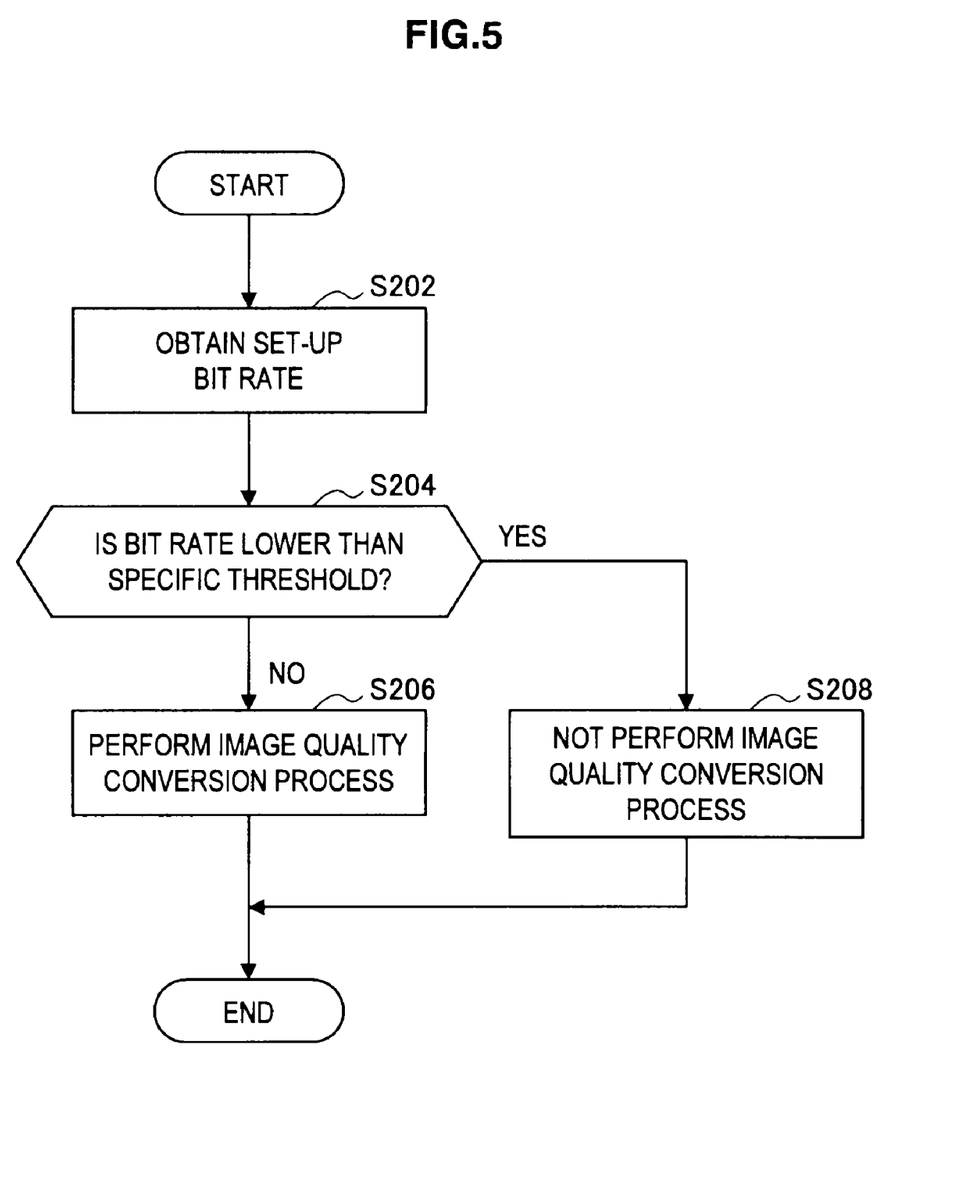
FIG. 5 is a flowchart illustrating an example of control of the image quality conversion process according to setting of a bit rate.

FIG. 5 is a flowchart illustrating an example of control of the image quality conversion process according to the setting of the bit rate. With reference to FIG. 5, the CPU 80 first obtains the bit rate set in advance by means of the user interface 86, for example (S202). Next, the CPU 80 determines whether the obtained bit rate is lower than a specific threshold (S204). Herein, the specific threshold may be 15 MBps and the like. At the step S204, when the obtained bit rate is lower than the specific threshold, the process proceeds to the step S208. If this is not the case, the process proceeds to a step S206. At the step S206, the CPU 80 allows the highly-gradating unit 22 and the image quantizing unit 26 to perform the above-described image quality conversion process (S206). At the step S208, the CPU 80 does not allow the highly-gradating unit 22 and the image quantizing unit 26 to perform the above-described image quality conversion process and allows them to directly output the input image $I_{in}$ as the recording target image $I_{rec}$ to the AV encoder 28.

By such control, when a low bit rate is specified (when the high compressibility is expected), for example, compression efficiency has priority over improvement in the image quality, and it becomes possible to perform the above-described image quality conversion process only when the improvement in the image quality is desired.

3-2. Second Example

Also, in this embodiment, for example, the process by the image quantizing unit 26 may be switched on/off for each pixel based on the above-described image quality deterioration data output from the analyzing unit 24. That is to say, for example, the image quantizing unit 26 may generate the above-described recording target image $I_{rec}$ by using the pixel value obtained by quantizing the pixel value of the high gradation image $I_{high}$ such that the quantization error is modulated into the band with relatively low sensitivity of the human visual characteristics for the pixel in which the image quality deterioration occurs and using the pixel value of the input image $I_{in}$ for the pixel in which the image quality deterioration does not occur.

Figure 6:
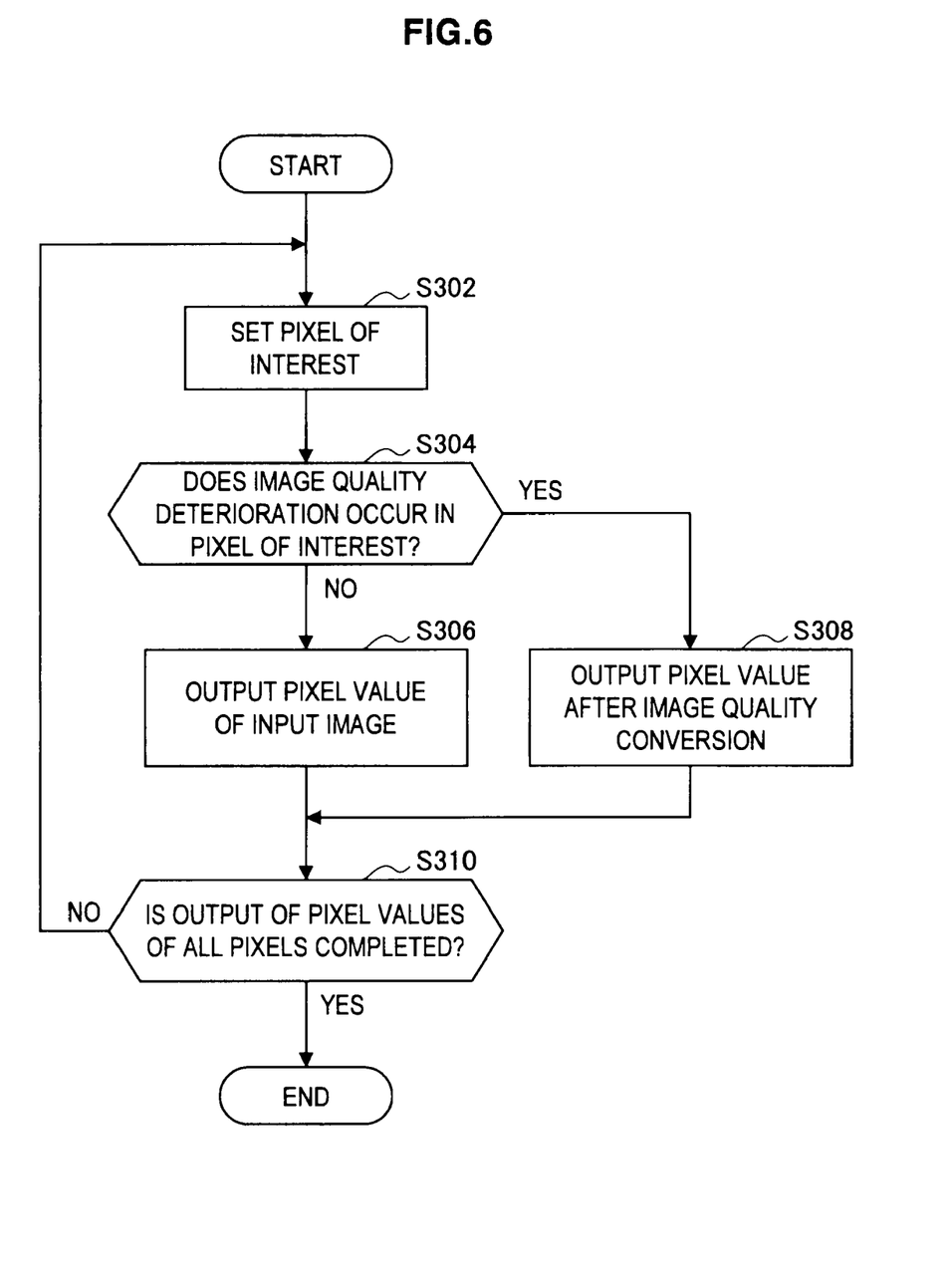
FIG. 6 is a flowchart illustrating an example of the control of the image quality conversion process according to presence or absence of the image quality deterioration for each pixel.

FIG. 6 is a flowchart illustrating an example of control of the image quality conversion process according to the presence or absence of the image quality deterioration for each pixel. With reference to FIG. 6, one pixel of the input image $I_{in}$ is first set as the pixel of interest (S302). Next, it is determined whether the image quality deterioration occurs in the set pixel of interest by using the image quality deterioration data generated by the analyzing unit 24 (S304). Herein, when the image quality deterioration occurs in the pixel of interest, the process proceeds to a step S308. If this is not the case, the process proceeds to a step S306. At the step S306, the pixel value of the input image $I_{in}$ is output to the AV encoder 28 as the pixel value of the pixel of interest forming the recording target image $I_{rec}$ (S306). At the step S308, the pixel value after the above-described image quality conversion process is output to the AV encoder 28 as the pixel value of the pixel of interest forming the recording target image $I_{rec}$ (S308). Thereafter, when the output of the pixel value of the recording target image $I_{rec}$ is not completed for all the pixels of the input image the process returns to the step S302 (S310). On the other hand, when the output of the pixel value of the recording target image $I_{rec}$ is completed for all the pixels of the input image $I_{in}$, the process of this flowchart ends.

By such control, for example, it becomes possible to improve the image quality by narrowing the target to the portion in which the false contour occurs specified by the image quality deterioration data, thereby achieving a balance of compression efficiency and reproducibility of the gradation. Note that, the control illustrated in FIG. 6 may be performed not for each pixel but for each partial image including a plurality of pixels.

3-3. Third Example

Further, the image quality conversion process may be controlled according to the bit rate classified into three stages by combining the method described with reference FIG. 5 and the method described with reference to FIG. 6.

Figure 7:
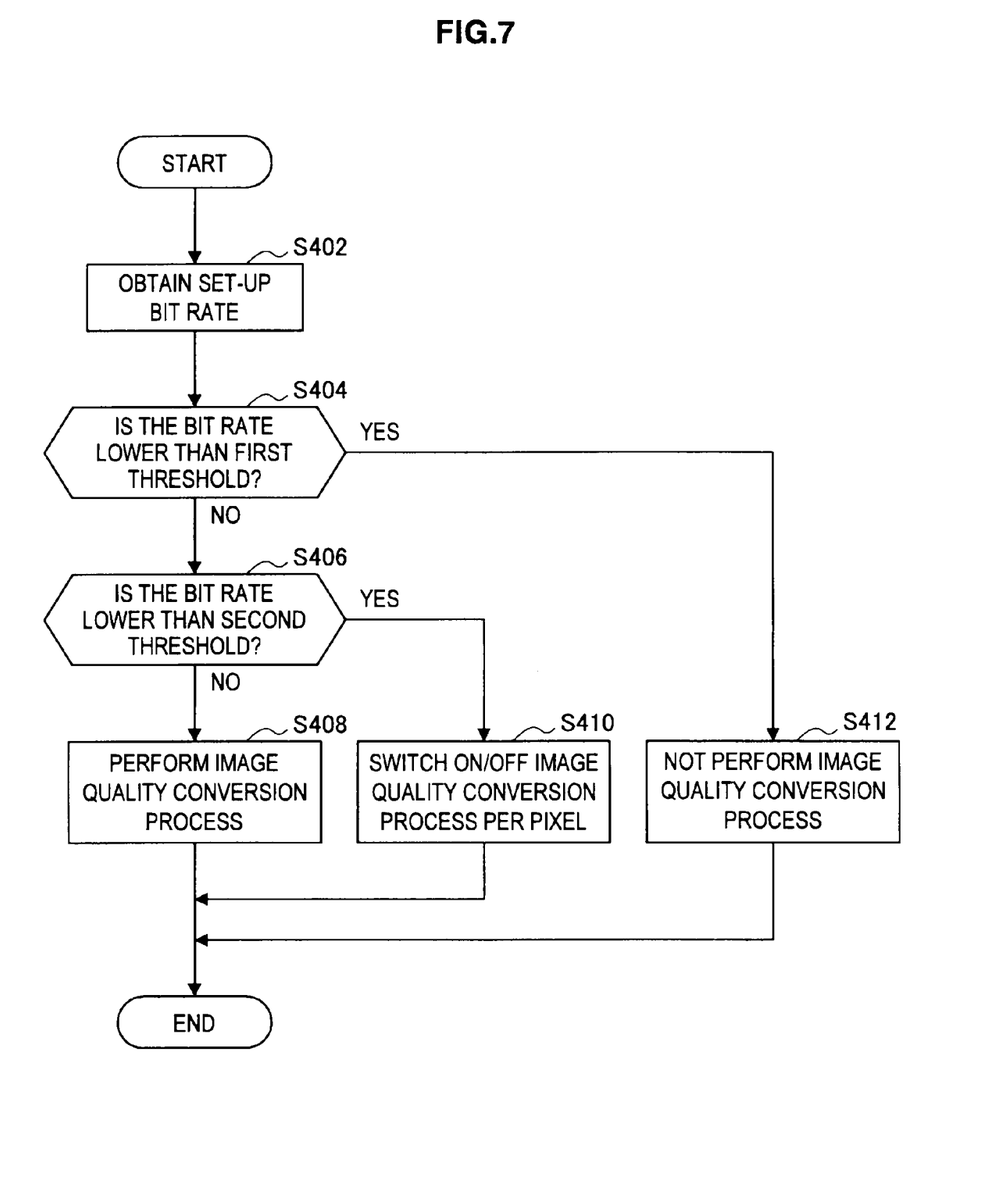
FIG. 7 is a flowchart illustrating another example of the control of the image quality conversion process according to the setting of the bit rate.

FIG. 7 is a flowchart illustrating an example of such control of the image quality conversion process. With reference to FIG. 7, the CPU 80 first obtains the bit rate set up in advance by means of the user interface 86, for example (S402). Next, the CPU 80 determines whether the obtained bit rate is lower than a first threshold (S404). Herein, the first threshold may be 4 MBps and the like. At the step S404, when the bit rate is lower than the first threshold, the process proceeds to a step S412. If this is not the case, the process proceeds to a step S406. Next, at the step S406, the CPU 80 determines whether the obtained bit rate is lower than a second threshold (S404). Herein, the second threshold may be 15 MBps and the like, for example. At the step S406, when the bit rate is lower than the second threshold, the process proceeds to a step S410. If this is not the case, the process proceeds to a step S408. At the step S408, the CPU 80 allows the highly-gradating unit 22 and the image quantizing unit 26 to perform the above-described image quality conversion process (S408). Also, at the step S410, according to the method described with reference to FIG. 6, the CPU 80 switches on/off the image quality conversion process by the highly-gradating unit 22 and the image quantizing unit 26 per pixel (or per partial image) by using the image quality deterioration data (S410). Also, at the step S412, the CPU 80 does not allow the highly-gradating unit 22 and the image quantizing unit 26 to perform the image quality conversion process and allows them to directly output the input image $I_{in}$ as the recording target image $I_{rec}$ to the AV encoder 28.

By such control, for example, when a low bit rate is specified, the compression efficiency has priority over the improvement in the image quality. Also, for example, when an intermediate bit rate is specified, the image quality is improved only in the portion in which the image quality deterioration such as the false contour occurs. When the high bit rate is specified, the image quality of the entire image is improved. According to this, it becomes possible to adaptively change a level of reproducibility of the gradation according to need of the user or the device.

3-4. Fourth Example

Further, the CPU 80 may temporarily increase an amount of bits assigned to the encoding process by the AV encoder 28 for the recording target image $I_{rec}$ of which quantization process by the image quantizing unit 26 is performed. It may be determined whether the quantization process by the image quantizing unit 26 is performed, for example, based on whether the data indicating the image quality deterioration is included in the image quality deterioration data or whether there is difference between the input image $I_{in}$ and the recording target image $I_{rec}$.

Figure 8:
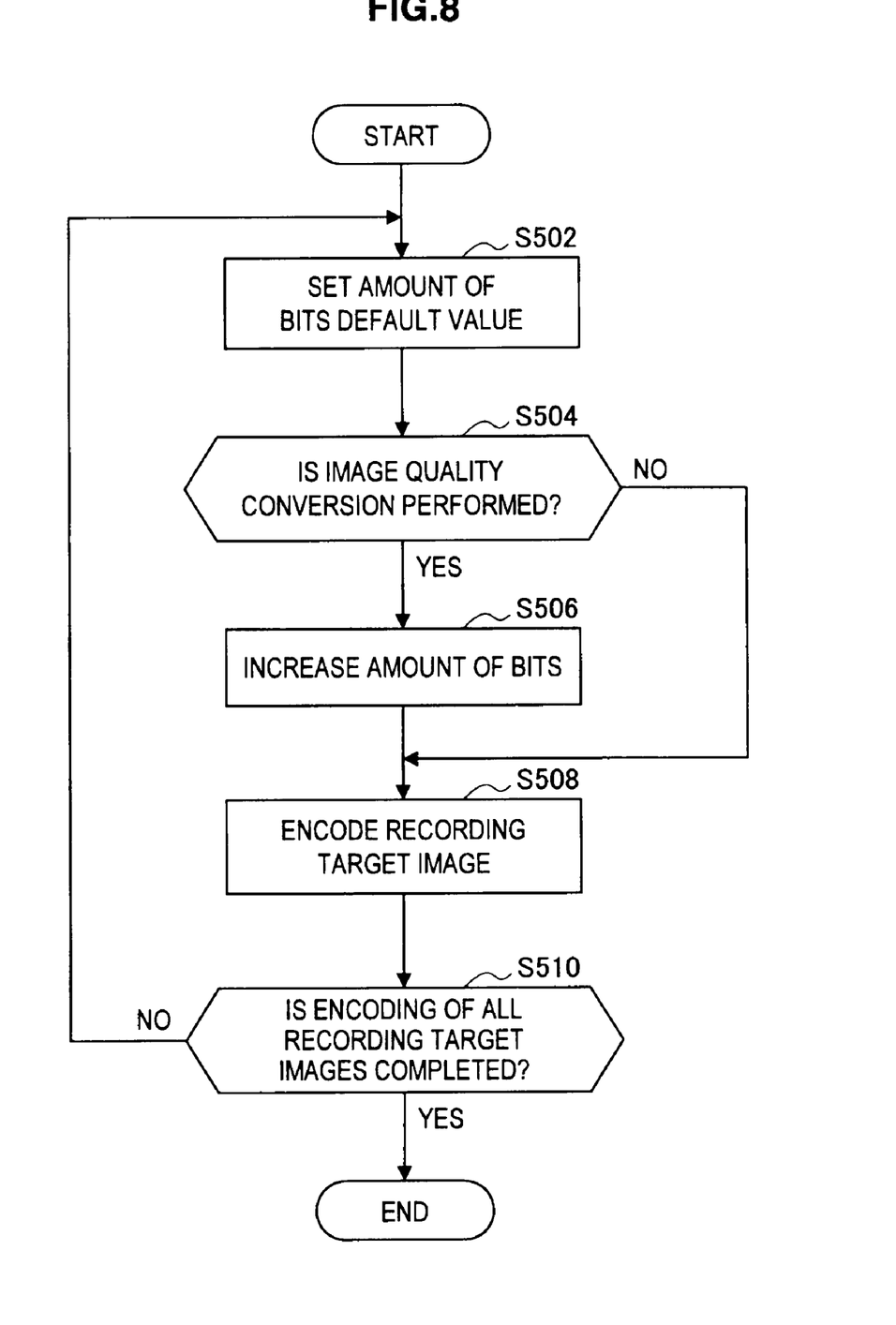
FIG. 8 is a flowchart illustrating an example of dynamic assignment of an amount of bits in an encoding process.

FIG. 8 is a flowchart illustrating an example of dynamic assignment of the amount of bits in such encoding process. Note that, in the example illustrated in FIG. 8, it is configured that a series of recording target images $I_{rec}$ output from the image quality converting unit 20 are sequentially supplied to the AV encoder 28. The CPU 80 first assigns the amount of bits for each image of the encoding process by the AV encoder 28 to a default value set in advance (S502). Next, the CPU 80 determines whether the conversion of the image quality is performed according to whether the data indicating the image quality deterioration is included in the image quality deterioration data, for example, for the input recording target image $I_{rec}$ (S504). Herein, when it is determined that the conversion of the image quality is performed, the process proceeds to a step S506. On the other hand, when it is determined that the conversion of the image quality is not performed, the step S506 is skipped. Next, at the step S506, the CPU 80 increases the amount of bits in the encoding process assigned at the step S502 (S506). The CPU 80 may change a rate to increase the amount of bits, for example, according to a rate of the pixels in which the image quality deterioration occurs in one image. Then, the AV encoder 28 compresses/encodes the recording target image $I_{rec}$ according to the assigned amount of bits (S508). Thereafter, when the encoding of all of the recording target images $I_{rec}$ is not completed, the process returns to the step S502 (S510). On the other hand, when the encoding of all of the recording target images $I_{rec}$ is completed, the process in this flowchart ends.

By such dynamic assignment of the amount of bits, for example, it becomes possible to temporarily assign large amount of bits only to the image in which the image quality deterioration occurs to apply the image quality conversion process also when the low bit rate is desired as the entire video including a series of image data. Note that, such dynamic assignment of the amount of bits is not limited to the example in FIG. 8 and may be performed in units of partial image included in the recording target image $I_{rec}$ or in units of group of pictures (GOP) including a plurality of recording target images $I_{rec}$, for example.

<4. Summary>

As above, an embodiment of the present invention is described with reference to FIGS. 1 to 8. According to the image recording device 10 according to this embodiment, the gradation depth of the input image quantized to the first gradation depth with which the sufficient gradation reproducibility may not be expected is temporarily increased to the second gradation depth by the highly gradating process. Then, by using the method to inhibit the gradation reproducibility from lowering, the image of which gradation depth is increased is quantized to the third gradation depth. According to this, for example, even when the first gradation depth and the third gradation depth are the equivalent values, the image of which visual image quality is improved than that of the input image may be recorded in the recording medium. Although the improvement in the image quality brings the increase in the amount of bits of the recorded image in general, by the method described with reference to FIGS. 5 to 8, an appropriate balance may be achieved between need relating to the bit rate and the improvement in the image quality. Further, it also becomes possible to apply the image quality conversion process according to this embodiment only to the portion in which the improvement in the image quality is expected.

Modified Example

It should be noted that the example in which an input image is already quantized to the gradation depth (first gradation depth) with which a sufficient gradation reproducibility may not be expected is principally described in this embodiment. However, it may be considered that the input image having the sufficient gradation depth (for example, 10 bits or higher) is input to the image recording device 10 according to this embodiment. In such a case, it is possible to reduce the gradation depth while maintaining the gradation reproducibility (that is to say, while maintaining the image quality perceived by the user) by simply applying the quantization process by the image quantizing unit 26 to the input image. However, as a result, the compressibility by the encoding process by the AV encoder 28 lowers and it might be difficult to achieve the bit rate expected by the user. Therefore, even when an input image having a sufficient gradation depth is input to the image recording device 10, the analyzing unit 24 illustrated in FIG. 2 is allowed to specify an area in which a false contour easily occurs in the input image by a smooth part detection and the like. Then, the quantization process by the image quantizing unit 26 is applied only to the specified area (or the input image including the area). According to this, it becomes possible to achieve an appropriate balance between maintenance of the gradation reproducibility at the time of the quantization and the need relating to the bit rate.

It should be understood by those skilled in the art that various modifications, combinations, sub-combinations and alterations may occur depending on design requirements and other factors insofar as they are within the scope of the appended claims or the equivalents thereof.

For example, the highly-gradating unit 22, the analyzing unit 24 and the image quantizing unit 26 of the image converting unit 20 are described as process blocks other than the CPU 80 in FIG. 2 of this specification. However, each process block may be realized as software by using a program in which the process of the highly-gradating unit 22, the analyzing unit 24 and the image quantizing unit 26 of the image converting unit 20 is described, for example. In this case, for example, the program in which each process is described is stored in the ROM 82 in advance, and is read by the RAM 84 at the time of execution to be executed by the CPU 80. Also, the process described to be controlled by the CPU 80 in this specification may be controlled by using hardware logic in place of the CPU 80.

The present application contains subject matter related to that disclosed in Japanese Priority Patent Application JP 2009-174395 filed in the Japan Patent Office on Jul. 27, 2009, the entire content of which is hereby incorporated by reference.

What is claimed is:

1. An image recording device, comprising:
a gradating unit to gradate an input image having a first gradation depth to generate a gradation image having a second gradation depth greater than the first gradation depth;
an image quantizing unit to quantize the gradation image generated by the gradating unit such that a quantization error is modulated into a predetermined band to generate a recording target image having a third gradation depth lower less than the second gradation depth;
an encoding unit to encode the recording target image generated by the image quantizing unit; and
a recording unit to record the recording target image encoded by the encoding unit in a recording medium.

2. The image recording device according to claim 1, further comprising:
a controlling unit to switch off the image quantizing unit such that the encoding unit encodes the input image as the recording target image, when a value less than a first threshold is set as a bit rate of an encoding process of the encoding unit.

3. The image recording device according to claim 1, further comprising:
an analyzing unit to output image quality deterioration data indicating presence or absence of image quality deterioration for each partial image having one or more pixels included in the input image,
wherein, the image quantizing unit generates the recording target image by
using a pixel value obtained by quantizing the gradation image such that the quantization error is modulated into the predetermined band for a partial image in which the image quality deterioration occurs and
using a pixel value of the input image for a partial image in which the image quality deterioration does not occur, based on the image quality deterioration data.

4. The image recording device according to claim 3, wherein the image quality deterioration data is data indicating whether a false contour occurs or not for each partial image.

5. The image recording device according to claim 1, further comprising:
a controlling unit temporarily to increase an amount of bits assigned to an encoding process by the encoding unit for an entirety of the recording target image to which a quantization process by the image quantizing unit is performed or a part of the recording target image to which the quantization process is performed.

6. An image recording method, comprising:
gradating an input image having a first gradation depth using a processor to generate a gradation image having a second gradation depth greater than the first gradation depth;
quantizing the gradation image using the processor such that a quantization error is modulated into a predetermined band to generate a recording target image having a third gradation depth less than the second gradation depth;
encoding the recording target image using the processor; and
recording the encoded recording target image in a recording medium.

7. A non-transitory computer readable storage medium encoded with computer program instructions, which when executed by a computer, cause the computer to perform a method of controlling an image recording device, comprising:
gradating an input image having a first gradation depth to generate a gradation image having a second gradation depth greater than the first gradation depth;
quantizing the gradation image such that a quantization error is modulated into a predetermined band to generate a recording target image having a third gradation depth less than the second gradation depth;
encoding the recording target image; and
recording the encoded recording target image in a recording medium.

8. The image recording device according to claim 1, wherein the image quantizing unit is switched off such that image quality conversion to a pixel of interest of the input image does not occur when it is determined that image quality deterioration does not occur in the pixel of interest.

9. The image recording device according to claim 2, wherein the controlling unit switches off the image quantizing unit and the gradating unit when the value less than the first threshold is set as the bit rate of the encoding process of the encoding unit to output to the encoder the input image as the recording target image, and
the controlling unit does not switch off the image quantizing unit and the gradating unit when a value not less than the first threshold is set as the bit rate of the encoding process of the encoding unit.

10. The image recording device according to claim 2, wherein selective image quality conversion is performed for each pixel of the input image when a value greater than or equal to the first threshold but less than a second threshold greater than the first threshold is set as the bit rate of the encoding process of the encoding unit, otherwise, image quality conversion is performed for each pixel based on whether image quality deterioration occurs in the pixel.

11. The image recording device according to claim 3, wherein, for the outputting of the image quality deterioration data, the analyzing unit individually sets each pixel included in the input image as a pixel of interest and identifies relationship data between each pixel of interest and adjacent pixels in first and second horizontal directions from the pixel of interest so as to determine whether the pixel of interest is visible as a portion of the input image in which false contour occurs.

12. The image recording method according to claim 6, further comprising:
stopping said quantizing to encode the input image as the recording target image, when a value less than a first threshold is set as a bit rate of an encoding process of the encoding module.

13. The image recording method according to claim 6, further comprising:
temporarily increasing an amount of bits for said encoding for an entirety of the recording target image to which a quantization process is performed or a part of the recording target image to which the quantization process is performed.

14. The non-transitory computer readable storage medium according to claim 7, further comprising:
switching off an image quantizing module and a gradating module when a value less than a first threshold is set as a bit rate of an encoding process of an encoding module such that the input image is output to the encoding module as the recording target image; and not switching off the image quantizing module and the gradating module when a value not less than the first threshold is set as the bit rate of the encoding process of the encoding module.

15. The non-transitory computer readable storage medium according to claim 14, further comprising:

selectively converting image quality of each pixel of the input image when a value greater than or equal to the first threshold but less than a second threshold greater than the first threshold is set as the bit rate of the encoding process of the encoding module, otherwise, image quality conversion is performed for each pixel based on whether image quality deterioration occurs in the pixel.

16. The non-transitory computer readable storage medium according to claim 7, further comprising:

switching off an image quantizing module such that image quality conversion of a pixel of interest of the input image does not occur when it is determined that image quality deterioration does not occur in the pixel of interest.

17. The non-transitory computer readable storage medium according to claim 7, wherein the first gradation depth is equal to the third gradation depth.

* * * * *